United States Patent
Bayer

(10) Patent No.: US 8,823,227 B2
(45) Date of Patent: Sep. 2, 2014

(54) DRIVE UNIT HAVING AT LEAST ONE TRANSMISSION STAGE

(75) Inventor: Thomas Bayer, Igersheim (DE)

(73) Assignee: Wittenstein AG, Igersheim (DE)

(*) Notice: Subject to any disclaimer, the term of this patent is extended or adjusted under 35 U.S.C. 154(b) by 885 days.

(21) Appl. No.: 12/745,571

(22) PCT Filed: Nov. 27, 2008

(86) PCT No.: PCT/EP2008/010050
§ 371 (c)(1),
(2), (4) Date: Oct. 20, 2010

(87) PCT Pub. No.: WO2009/071228
PCT Pub. Date: Jun. 11, 2009

(65) Prior Publication Data
US 2011/0031829 A1 Feb. 10, 2011

(30) Foreign Application Priority Data
Dec. 4, 2007 (DE) .......................... 10 2007 058 605

(51) Int. Cl.
*H02K 7/116* (2006.01)
*F16H 49/00* (2006.01)
*F16H 25/06* (2006.01)

(52) U.S. Cl.
USPC ............................... 310/83; 74/640; 475/168

(58) Field of Classification Search
USPC .......................... 310/82–83; 475/168; 74/640
See application file for complete search history.

(56) References Cited

U.S. PATENT DOCUMENTS

| | | | |
|---|---|---|---|
| 3,239,699 A * | 3/1966 | Ferrary | 310/83 |
| 3,301,091 A * | 1/1967 | Reese | 74/640 |
| 3,561,006 A * | 2/1971 | Humphreys | 310/82 |
| 3,756,674 A * | 9/1973 | Bendall | 384/322 |
| 4,449,425 A | 5/1984 | Carden | |
| 4,736,654 A * | 4/1988 | Ren | 475/168 |
| 4,798,104 A | 1/1989 | Chen et al. | |
| 4,918,344 A * | 4/1990 | Chikamori et al. | 310/83 |
| 5,293,107 A | 3/1994 | Akeel | |
| 5,479,058 A * | 12/1995 | Seidou | 310/261.1 |
| 5,643,128 A * | 7/1997 | Kennedy | 475/168 |
| 6,342,739 B1 * | 1/2002 | Furuya et al. | 310/40 MM |
| 6,416,438 B1 * | 7/2002 | Choi et al. | 475/170 |

(Continued)

FOREIGN PATENT DOCUMENTS

| | | |
|---|---|---|
| DE | 19738107 A1 | 3/1999 |
| DE | 19747566 C1 | 4/1999 |

(Continued)

OTHER PUBLICATIONS

Machine Translation, Kiyofuji, JP 07-203654, Aug. 1995.*

(Continued)

*Primary Examiner* — Burton Mullins
(74) *Attorney, Agent, or Firm* — Bachman & LaPointe, P.C.

(57) ABSTRACT

In a drive unit having at least one transmission stage (Ü) and one drive element (4) for driving with high power density, having a drive element (4), and element (8), and an output element (14), wherein a translation and transmission of a drive torque occurs between the drive element (4) and the output element (14) via a plurality of radially movable toothed segments (10), the drive element (4) is to be embodied as an electrical drive for the transmission stage (Ü).

6 Claims, 3 Drawing Sheets

(56) References Cited

U.S. PATENT DOCUMENTS

| | | | |
|---|---|---|---|
| 6,664,711 B2 * | 12/2003 | Baudendistel | 310/323.02 |
| 7,409,891 B2 * | 8/2008 | Takemura | 74/640 |
| 7,453,176 B2 * | 11/2008 | Davison | 310/75 R |
| 2003/0047025 A1 | 3/2003 | Ruttor | |
| 2010/0024593 A1 | 2/2010 | Schmidt et al. | |

FOREIGN PATENT DOCUMENTS

| | | | | | |
|---|---|---|---|---|---|
| DE | 19754920 | A1 | | 6/1999 | |
| DE | 10042398 | A1 | | 3/2002 | |
| DE | 10 2007 016 189 | A1 | | 10/2008 | |
| DE | 10 2007 020 415 | A1 | | 11/2008 | |
| EP | 0231392 | | * | 8/1987 | H02K 7/116 |
| GB | 153 982 | A | | 11/1920 | |
| GB | 400 282 | A | | 10/1933 | |
| JP | 51-136079 | | * | 11/1976 | F16H 25/06 |
| JP | 62-93446 | U | | 6/1987 | |
| JP | 06-315879 | A | | 11/1994 | |
| JP | 07-203654 | A | * | 8/1995 | H02K 7/116 |
| WO | 99-36711 | | * | 7/1999 | F16H 25/06 |
| WO | WO 2008/119418 | A | | 10/2008 | |

OTHER PUBLICATIONS

English abstract of DE 19754920 A1, provided by http://worldwide.espacenet.com, printed on Apr. 4, 2012.
English abstract of DE 10042398 A1, provided by http://worldwide.espacenet.com, printed on Apr. 4, 2012.
English abstract of DE 19738107 A1, provided by http://worldwide.espacenet.com, printed on Apr. 4, 2012.
English abstract of De 19747566 C1, provided by http://worldwide.espacenet.com, printed on Apr. 4, 2012,.
Official action dated Mar. 26, 2013 for JP 2010-536358.

* cited by examiner

DRIVE UNIT HAVING AT LEAST ONE TRANSMISSION STAGE

This application is a National Stage of International Application No. PCT/EP2008/010050, filed Nov. 27, 2008, which is based upon and claims the benefit of priority from prior German Patent Application No. 10 2007 058 605.3, filed Dec. 4, 2007, the entire contents of all of which are incorporated herein by reference in their entirety.

The present invention relates to a drive unit having at least one transmission stage and one drive element for driving with high power density, having a drive element, an element, and a driven element, a conversion and a transfer of a drive torque taking place between the drive element and the driven element via a plurality of radially movable toothed segments.

Conventional drive units are known and available on the market in various forms and embodiments.

In the prior art, different transmissions with different transmission stages are generally connected to conventional electric motors to suit specific customers and power requirements.

The disadvantages are that an installation space is very limited, production costs are very high due to the two forms of housing, the number of bearing assemblies required is too high, entailing frictional losses, etc.

Furthermore, there are known drive units in which parts of transmissions and parts of the electric drives are at least partially combined so that parts of the output line of an electric drive are already embodied as a drive line or element of a transmission arranged directly downstream or of a transmission stage. Here too, the power outputs of such transmissions are limited while their overall size is very large.

Moreover, known drive units include generators, in which a torque is transferred directly or via an upstream transmission in order to generate electric current in the generator.

The preamble defining the type under consideration is also intended to include drive units of this kind.

It is the underlying object of the present invention to provide a drive unit of the type stated at the outset which eliminates the stated disadvantages of the conventional drive unit, the intention being to ensure very high torques while making optimum use of an installation space and reducing overall length and diameter. In addition, the intention is to allow very high power density and very great compactness while using the minimum amount of installation space and minimizing weight.

Another known understanding of drive units in the prior art is as units in which a drive torque from an electric drive is transferred to a transmission stage in order to convert the drive torque of the electric drive in selectable transmission stages.

However, the generic term "drive element" is also intended to include a situation where the reverse path is also possible and a drive torque introduced via a transmission stage or a transmission is converted in selectable transmission stages in order to drive a generator for the purpose of generating electric current. Both embodiments are to be understood by the general term "drive unit" in the present invention.

It has proven particularly advantageous in the context of the present invention to provide a drive unit in which a stator is provided in an outer housing or the outer housing is designed as a stator.

The actual drive element is seated coaxially within the housing or stator, being supported in a manner that allows coaxial rotation, and has a corresponding number of magnetic field exciters arranged radially on the outside, in particular permanent magnets or magnets that can be actively excited, such as coils or the like, which can be driven via the stator for rotary motion of the drive element.

In this arrangement, an electric motor with an extremely large diameter is formed, which serves to transfer very large torques to the drive element.

By means of its internal contour, the drive element simultaneously serves as a drive for the coaxial transmission for the purpose of acting directly or indirectly on a plurality of toothed segments which are supported in an element in a manner which allows radial movement and are in engagement with an inner driven element having external teeth.

In this way, given the very large diameter, the heat can be dissipated to the outside very easily via the housing or stator, and furthermore, by virtue of the large diameter, there is as a result a high torque transfer from the integrated electric drive, which is formed between the drive element and the housing, to the rigid element having the inserted toothed segments for the production of a conversion to the driven element.

By means of this construction according to the invention of the drive unit, complete integration of the transmission or transmission stage into the electric drive or of the electric drive into the transmission is possible, allowing a considerable reduction in overall length compared with conventional standard motor-transmission combinations.

Moreover, power density is improved by the large diameter of the electric drive. A hollow shaft as a driven element can be produced with a significantly larger diameter, and this is likewise significant.

Further advantages, features and details of the invention will emerge from the following description of preferred illustrative embodiments and these show, in FIGS. 1a and 1b schematically illustrated plan views of conventional drive units for transferring and converting torques with electric drives;

Figure 1B:
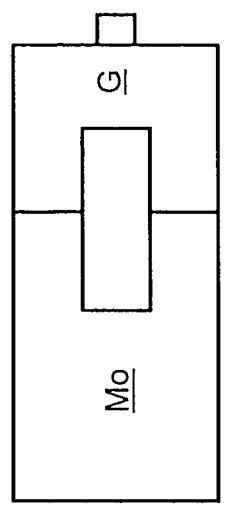
Figure 1A:
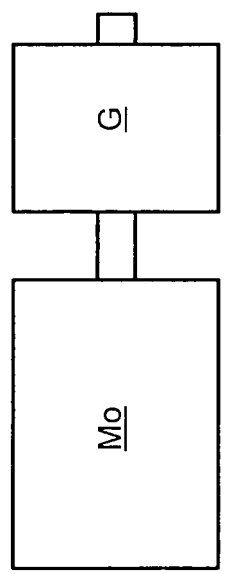

According to FIG. 1a, a conventional drive unit has of an electric drive, in particular an electric motor Mo, and, in general, an adjoining transmission G.

In this context, it is possible for a very wide variety of transmissions G to be combined in series with a very wide range of motors Mo and also with different transmission stages in order to obtain the desired rotational speed and torques and power stages. It is disadvantageous that the total weight, production costs and overall length are not optimized in relation to the power.

Furthermore, the prior art includes drive units of the type indicated in FIG. 1b, which are also formed by an electric drive, in particular a motor Mo and a transmission G, individual components on the driven side of the motor being combined with drive-side components of the transmission.

However, this is still not an optimum solution for significantly reducing an overall weight in relation to the total power.

Figure 2:
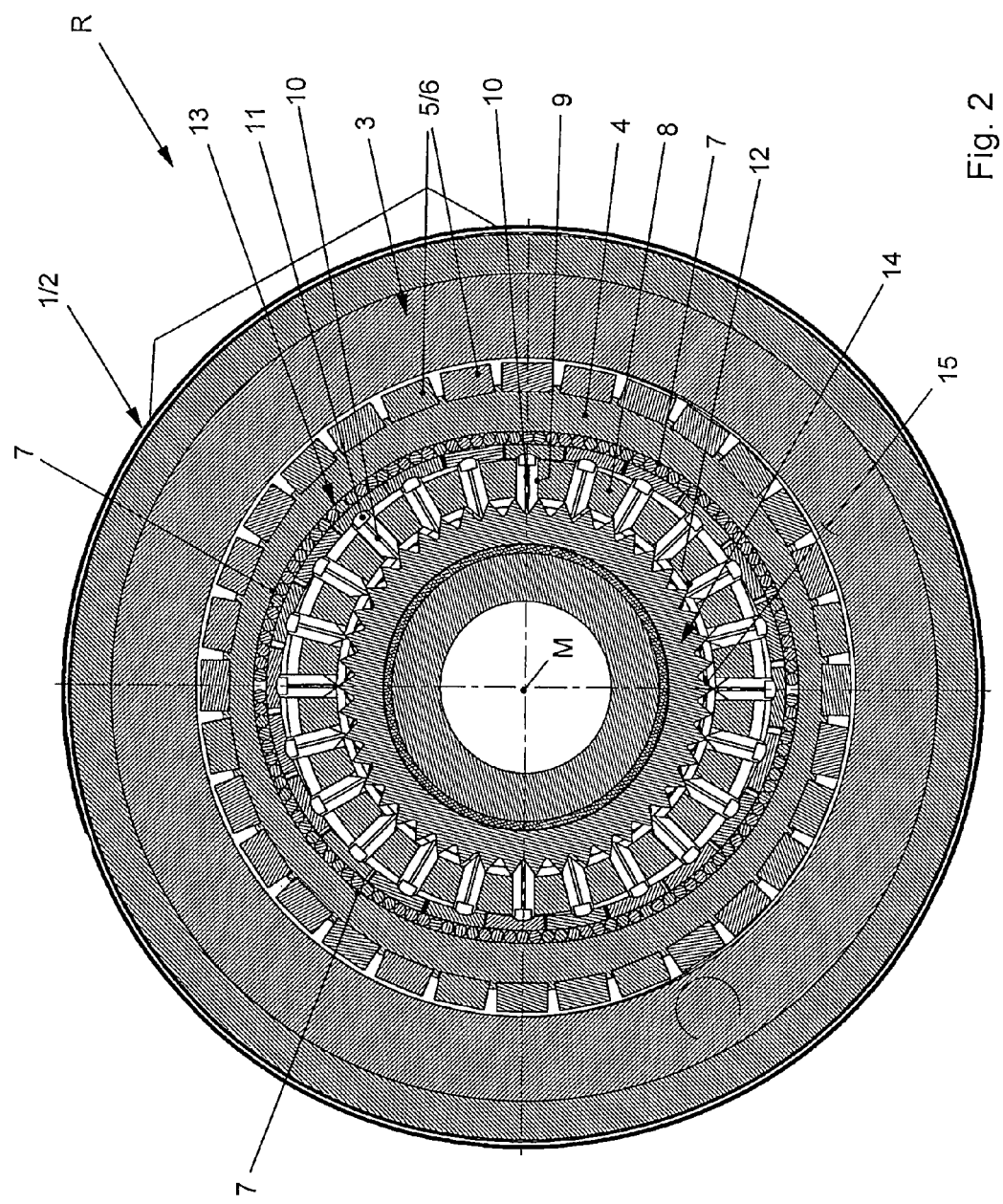
FIG. 2 shows a schematically illustrated cross section through a drive unit according to the invention.

According to FIG. 2, a drive unit R according to the invention for industrial drive engineering with high power density has a housing 1, which is designed as a stator 2. The housing 1, in particular the stator 2, is of annular design and has a plurality of excitation coils 3, merely indicated here, which are arranged pointing inward in a radially distributed manner.

A drive element 4 is arranged for rotation within the housing 1, e.g. within the stator 2, and has on the outside a plurality of radially arranged magnetic field exciters 5, in particular permanent magnets 6, or alternatively magnets that can be actively excited. In this arrangement, the magnetic field exciters 5, in particular the permanent magnets 6, can be seated on the drive element 4, or be integrated into the latter. There is no intention to limit the invention to this option.

The drive element 4 is supported by way of the teeth in such a way that it can be moved in rotation about a center line M relative to the housing 1, this being merely indicated here and not shown in detail. In this arrangement, the drive element 4 has an inner contour 7 which, as an inner surface, is of contoured design.

The inner contour 7 of the drive element 4 can be produced as a contour 7 of polygonal design, for example.

An element 8 is arranged within the drive element 4, in particular being connected in a rotationally fixed manner to the housing 1 or stator 2 in order to guide and support individual toothed segments 10 radially in radial guides 9.

The toothed segments 10 have an outward-oriented tooth base 11 and an inward-oriented tooth flank 12.

In order to move the individual toothed segments 10 radially inward or outward, the tooth bases 11 thereof come into direct or indirect contact with the contour 7 of the drive element 4 and are then moved radially inward or outward in accordance with the contour 7 of the moving drive element 4.

However, an intermediate element 13 that follows the contour 7 should preferably be provided between the tooth base 11 and the inner contour 7 of the drive element 4 to transmit the corresponding movement of the contour 7 to the respective toothed segments 10.

The intermediate element 13 can be a flexible ring, a segmented bearing ring and/or a rolling-contact bearing assembly or the like, for example, in order to move the individual toothed segments 10 inward or outward by means of the contour 7 in a supported manner.

By means of the corresponding contour 7 of the drive element 4, it is possible for the toothed segments 10 to be moved inward and outward accordingly as a function of the contour 7, with the result that said toothed segments mesh with a driven element 14 arranged coaxially within element 8 during this movement. The driven element 14 has external teeth 15, into which the individual toothed segments 10 engage by means of their tooth flanks 12 to produce a conversion ratio. The driven element 14 with its external teeth 15 is preferably designed as a hollow shaft. However, this can also be designed as a conventional shaft in order to transfer an output torque.

It has proven particularly advantageous in the present invention that the electric drive is provided with a very large diameter coaxially in the housing 1. It is thus possible to produce a drive unit R that has a very small overall length and an integrated electric drive with a high drive torque and that can nevertheless transfer a high conversion ratio to a driven element 4 coaxially within the drive element via a plurality of toothed segments.

Optimum heat dissipation to the outside can be achieved through the housing 1 situated on the outside, in particular through the stator 2 situated on the outside and the drive element 4 with magnetic field exciter 5 situated coaxially on the inside, and, as a result, the power of the drive unit R is also significantly increased.

Moreover, optimum use is made of an installation space through the arrangement, in accordance with the invention, of the drive unit R and of its components, thereby optimizing power density. Moreover, a very large hollow shaft diameter of the driven element 14 is achieved, thereby creating an annular drive unit, in the form of a coaxial transmission with an integrated high-power drive, for example.

Figure 3:
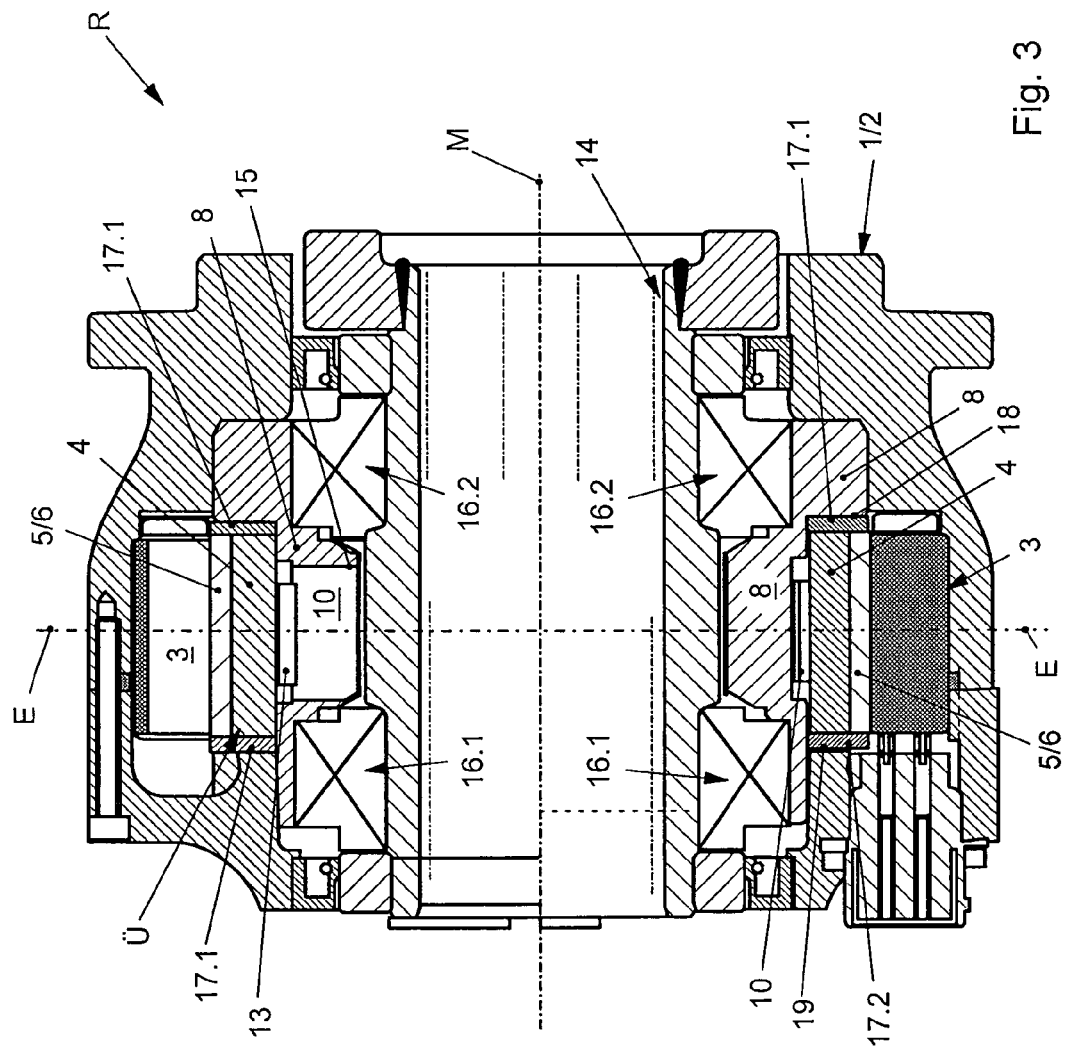
FIG. 3 shows a schematically illustrated longitudinal section through the drive unit according to the invention as shown in FIG. 2.

The illustrative embodiment in FIG. 3 shows in longitudinal section the coaxial transmission depicted in FIG. 2.

There it is evident how, in the housing 1, the latter is used as a stator 2, for example, in order to arrange the excitation coils 3 there in the housing 1 in an annular pattern.

The electric drive element 4 with its inner contour 7 is then inserted coaxially within, preferably in a common plane E, the plurality of magnetic field exciters 5, in particular permanent magnets 6, being arranged on its outer circumferential surface in the preferred illustrative embodiment.

In this arrangement, the inner contour 7 acts, preferably via at least one intermediate element 13, on the toothed segments 10 supported in the guide 9 in element 8, which segments mesh with the external teeth 15 of the driven element 14.

The individual elements are arranged coaxially.

In the preferred illustrative embodiment, the element 8 for radial support of the individual toothed segments 10 is securely connected to the housing 1 or fixed to the latter. The bearing elements 16.1, 16.2 are supported internally on the latter at the end adjacent to the external teeth 15 and at the end adjacent to the toothed segments 10 and in this way support the driven element 14, which is situated coaxially on the inside. Said driven element can preferably be embodied as a hollow shaft of large diameter but it is also possible for it to be embodied as any other kind of shaft.

Appropriate sealing elements (not shown specifically here) seal the region between the drive element 14 and the housing 1 at the ends.

It is also advantageous in the present invention that the actual support of the electric drive element 4, which is driven in rotation by way of the excitation coils 3 of the stator 2, is provided in the radial direction by the magnetic field generated by means of the excitation coils 3 and that at the same time axial support is also ensured.

In addition, the electric drive element 4 can be adjoined at each end by bearings 17.1, 17.2, preferably designed as axial bearings, which are supported on element 8 at an end flange 18.

On the other hand, an additional flange 19 provides end support for the drive element 4.

The bearings (17.1, 17.2) are preferably designed simply as pure sliding bearings and serve merely to provide slight alignment and centering and to limit play in the axial direction. This is likewise intended to fall within the scope of the present invention.

It is therefore possible to dispense with an axial and/or radial bearing assembly, in the form of a separate rolling-contact bearing assembly for the electric drive element 4 for example, and this, in turn, reduces friction, creates installation space and ensures a smaller overall length and a smaller diameter for the drive unit.

The present invention provides a drive unit R which is very compact and, in a very short installation space, provides a drive and also a transmission stage Ü as a drive unit (R) in order to transfer very high torques to the transmission stage (Ü) by means of the drive element 4, which is of annular design. At the same time, in the present invention the components of the electric drive element 4 as the output of the electric drive unit are combined with the drive element of the transmission stage Ü of the drive unit R.

| List of reference signs | |
|---|---|
| 1 | Housing |
| 2 | Stator |
| 3 | Excitation coils |

| List of reference signs | |
|---|---|
| 4 | Drive element |
| 5 | Magnetic field exciter |
| 6 | Permanent magnets |
| 7 | Contour |
| 8 | Element |
| 9 | Guide |
| 10 | Toothed segment |
| 11 | Tooth base |
| 12 | Tooth flank |
| 13 | Intermediate element |
| 14 | Driven element |
| 15 | External teeth |
| 16 | Bearing element |
| 17 | Bearing |
| 18 | Flange |
| 19 | Flange |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |

| List of reference signs | |
|---|---|
| 72 | |
| 73 | |
| 74 | |
| 75 | |
| 76 | |
| 77 | |
| 78 | |
| 79 | |
| R | Drive unit |
| M | Center line |
| Ü | Conversion stage |
| E | Plane |
| M | Center line |
| G | Transmission |
| Mo | Motor |

The invention claimed is:

1. A drive unit comprising:
a housing forming a stator;
a drive element arranged for rotation within the stator;
an output element arranged in the housing;
a transmission stage for transferring drive torque via the drive element to the output element, wherein the transmission stage comprises a plurality of movable toothed segments, and the drive element and transmission stage are arranged coaxially and lie in a common plane (E); and
the drive element has a contoured inner surface which acts on the plurality of movable toothed segments, wherein the drive element has an outer surface having a plurality of magnetic field exciters arranged on the outer surface, wherein the magnetic field exciters comprise permanent magnets, wherein the transmission stage comprises an element having the plurality of toothed segments inserted into guides, wherein the toothed segments are capable of radial movement and wherein the element is coaxially within the drive element, wherein an intermediate element comprising a segmented bearing ring is provided between the toothed segments and the contoured inner surface, and wherein the contoured surface acts via the intermediate element on the plurality of movable toothed segments.

2. The drive unit as claimed in claim 1, wherein the drive element is an electrically driven rotor element.

3. The drive unit as claimed in claim 1, wherein the output element comprises an external side and wherein the output element has external teeth on the external side.

4. The drive unit as claimed in claim 1, wherein the toothed segments engage radially, individually or in groups, in external teeth on the output element to produce the conversion ratio.

5. The drive unit as claimed in claim 1, wherein the output element comprises a shaft having external teeth.

6. The drive unit as claimed in claim 1, wherein a plurality of excitation coils are arranged in the stator in order to drive the drive element fitted with the magnetic field exciters in rotation about a center line (M).

* * * * *